UNITED STATES PATENT OFFICE 2,568,118

OXYALKYLATED DERIVATIVES OF PHENOL-ISANIC ACID-FORMALDEHYDE RESINS

Melvin De Groote, University City, and Bernhard Keiser, Webster Groves, Mo., assignors to Petrolite Corporation Ltd., Wilmington, Del., a corporation of Delaware No Drawing. Application February 13, 1950, Serial No. 144,032

4 Claims. (Cl. 260—19)

This invention is concerned with certain new chemical products, compounds, or compositions which have useful application in various arts. It includes methods or procedures for manufacturing said new chemical products, compounds or compositions, as well as the products, compounds or compositions themselves. The particular compounds herein described in greater detail subsequently, are hydrophile synthetic products; said hydrophile synthetic products being oxyalkylation products of:

(A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, organic solvent-soluble, water-insoluble phenol-isamic acid-formaldehyde resin; said resin being derived by a reaction involving approximately 2 moles of a difunctional phenol, one mole of isamic acid, and one-quarter to one-half mole of formaldehyde; said resin being formed in the substantial absence of trifunctional phenols; said phenol being of the formula:

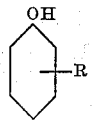

in which R is a hydrocarbon radical having at least 4 and not more than 14 carbon atoms and substituted in the 2,4,6 position; said oxyalkylated resin being characterized by the introduction into the resin molecule of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Reference is made to our two-copending applications, Serial Nos. 59,768 and 59,767, both filed November 12, 1948 the former of which is now Patent 2,560,333 issued July 10, 1951. The first of the aforementioned co-pending applications is concerned with a process for breaking petroleum emulsions of the water-in-oil type, characterized by subjecting the emulsion to the action of a demulsifier including hydrophile synthetic products; said hydrophile synthetic products being oxyalkylation products of:

(A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, organic solvent-soluble, water-insoluble phenolic resin; said resin being derived at least in part by reaction with an acetylenic hydrocarbon so as to introduce an altered acetylenic radical as the linking structure between phenolic nuclei; said oxyalkylated resin being characterized by the introduction into the resin molecule of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

The second of the aforementioned co-pending applications is concerned with the oxyalkylated resins referred to immediately preceding as new compounds or compositions of matter and not specifically limited to their use in demulsification.

The present invention is concerned with oxyalkylated derivatives of certain resins which involve in their manufacture a phenol, an acetylenic reactant, and an aldehyde, such as formaldehyde. In light of what will be said hereinafter, however, one cannot necessarily predict as to whether or not the acetylenic reactant necessarily forms a phenolic resin of the same type as acetylene. The acetylenic reactant employed is a fatty acid which contains, among other things, an acetylenic linkage. This fatty acid is derived from a vegetable oil, which, in turn, is derived from an African nut. The nut is known as an Isano nut, or Boleko nut. It also is known by other terms. These nuts, or similar nuts which are conveniently included in the same designation, have been shipped into Europe for the last several years or longer, and the oil derived therefrom has been used as drying oil.

The exact nature of the fatty acids which are present as glycerols in Isano nuts, Boleko nuts, or similar nuts (Ongueko, or Ongoké) is not known. Such nut-bearing trees or shrubs occur in the French and Belgian Congo and apparently belong to what botanists describe as Olimiae, botanically known as Onguekoa Gore Engler or also as Ongokea Klaineana.

For a brief and authoritative examination of the literature in this regard, see Ralston "Fatty Acids and Their Derivatives," John Wiley & Sons, Inc., New York, 1948. Steger and van Loon (Fette u. Seifen, 44, 243 (1937)), identified the fatty acid as being either 6-octadecen-9-ynoic acid or 9-octadecen-6-ynoic acid. Subsequently, Castille (Ann., 543, 104 (1940)), concluded that a similar acid which he termed erythrogenic acid was represented by either of the following two formulae:

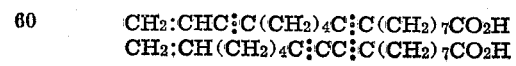

Subsequently, Steger and van Loon (Rec. trav. chim., 59, 1156 (1940)), named this acid "isamic" acid.

Since the composition of this material is still a matter for further examination, we are using the term "isanic" acid to mean the fatty acid obtained by the saponification of any of the above indicated fatty esters with the understanding that such acid contain at least one acetylenic linkage, and in addition to such acetylenic linkage, is probably more highly unsaturated, due to either the presence of one or more additional acetylenic linkages, or one or more double bonds. Others have referred to this same acid apparently as Boleko nut oil fatty acid. We are using the term isanic acid as synonymous with this same terminology.

Attention is directed also to what is said as to the similarity or the equivalency of these three oils in Lewkowitsch, J., "Chemical Technology and Analysis of Oils, Fats and Waxes," volume II, 6th edition, pp. 159-60, MacMillan & Co., Ltd., New York, 1921; see also what is said in regard to isanic acid, idem., volume I, p. 214. Presumably, "isamic" acid and "isanic" acid are the same.

See also what is said by Bergmann in "The Chemistry of Acetylene and Related Compounds," p. 103, Interscience Publishers, Inc., New York, 1948.

As previously noted, we have obtained these nuts, which are suggestive of a large filbert, cracked and ground them in the customary manner, expressed as much oil as we could under pressure, and then extracted with xylene by refluxing under a condenser. We subsequently evaporated the xylene, mixing together the oil obtained by expressing and extracting, clarified it by filtering through fuller's earth, and then saponified it with caustic soda. We made a solution of the soap or salt so obtained and then liberated the free fatty acids by use of dilute hydrochloric acid. These acids, which, as previously stated, will be referred to as isanic acid, have been employed in the subsequent preparations.

Such products are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

This specific application or use of our reagents is described and claimed in our co-pending application Serial No. 144,031, filed February 13, 1950.

The specific resins herein employed and obtained from difunctional phenols, isanic acid and formaldehyde, are the specific subject-matter of our co-pending application Serial No. 144,033, filed February 13, 1950.

The compounds or cogeneric mixtures herein described are not only useful for breaking oil field emulsions, but also are useful for various other purposes, such as a break-inducer in the doctor treatment of sour hydrocarbons, as an emulsifying agent, as a component in the preparation of micellar solutions, as an additive to non-hydrocarbon lubricants, as an intermediate for further reaction, by virtue of the terminal hydroxyl radical, etc.

Having obtained such intermediate product or resin, the next step involves reaction with an alkylene oxide, such as ethylene oxide, propylene oxide, butylene oxide, glycide or methylglycide.

For all practical purposes, such oxyalkylations are conducted in a conventional manner. The oxyalkylated derivatives so obtained are employed for the resolution of petroleum emulsions of the water-in-oil type. The oxyalkylated derivatives themselves may be used for a variety of purposes other than demulsification where surface-active materials are of value, as, for example, producing emulsions, detergents, agricultural sprays, further reaction with chemical compounds, reactive towards hydroxyl radicals, etc.

Specifically, then, the use of such oxyalkylated derivatives is not limited to the resolution of petroleum emulsions of the water-in-oil type.

For convenience, what is said hereinafter will be divided into two parts:

Part 1 will be concerned with the preparation of the resinous compounds; and

Part 2 will be concerned with the oxyalkylation of the resinous compound.

PART 1

Based on actual acid value of the Boleko oil fatty acid obtained by us, we have used a molecular weight for the fatty acid of 288, although it is understood that this value is not intended to represent any different structure than what was said previously. There may have been present some non-saponifiable material.

Example 1a 150 grams of Boleko nut oil fatty acid (isanic acid) and 172 grams of para-tertiary amylphenol were reacted in a resin pot. The equipment used was a conventional two-piece laboratory resin pot. The cover part of the equipment had four openings: One for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus, so that the single piece of apparatus could be used as either a reflux condenser or a water trap, depending upon the position of the three-way glass stop-cock. This permitted convenient withdrawal of water from the water trap. The equipment, furthermore, permitted any setting of the valve without disconnecting the equipment. The resin pot was heated with a glass fiber electrical heater constructed to fit snugly around the resin pot. Such heaters, with regulators, are readily available.

To the above mixture of two reactants, there was added 15 grams of zinc acetate as a catalyst. The mixture was stirred for 16 hours at 180°–190° C., and then stirred for 8 hours at 210°–215° C. At the end of this time tests for unreacted amylphenol showed there was only a small amount, or mere trace, present. At this point the reaction mass was allowed to cool to approximately 100° C., and then an amount of xylene equal in weight to the reaction mass, approximately 225 grams, was added. When solution was complete, the mixture was removed from the reaction flask and filtered, and then returned to the flask for further reaction with formaldehyde. There were also added 3½ grams of concentrated hydrochloric acid and 1½ grams of monoalkyl ($C_{10}$–$C_{20}$, principally $C_{12}$–$C_{14}$) benzene monosulfonic acid sodium salt. We are not convinced that one need add any more acid catalyst, for the reason that apparently enough zinc acetate or acetic acid stays behind from the previous reaction to act as a catalyst, but since this practice had been uniformly satisfactory in the manufacture of a large variety of resins, it was followed in this instance purely as a precautionary measure.

In the final step, then, the previously formed resin, the catalyst, solvent, etc., were heated to about 80°–85° C., at which point 44 grams of formaldehyde were run in and the temperature raised to approximately 100° C., or slightly higher. The reaction mixture was then permitted to reflux at 100°–105° C., for one-half to two hours. The reflux trap arrangement was then changed from the reflux position to the normal water entrapment position. The uncombined formaldehyde, the water solution and the water of reaction were permitted to distil out and collect in the trap. As the water distilled out the temperature gradually increased to that determined by the boiling point of xylene, to wit, about 150° C. The water was removed in about 1½ hours. An examination of the aqueous solution obtained in the trap showed that considerable formaldehyde was present, i. e., although only one-half mole or less of formaldehyde had been added for each mole of Boleko oil fatty acids and each two moles of amylphenol, yet only a fraction of this formaldehyde had been employed for reaction. Examination showed that the amount used in reaction was approximately one-half the amount added, or somewhat greater, i. e., one-fourth mole or thereabouts, the obvious range being from a quarter of a mole up to a half a mole. The final product was a resinous material suggestive of a very viscous, liquid, or a tacky solid, dark red or blackish red in color. This applied to the appearance of the solvent-free material.

No effort is made to speculate as to the composition of this resin. Attention is directed again to our two aforementioned co-pending applications Serial Nos. 59,767 and 59,768, both filed November 12, 1948, in which there is a discussion of the chemistry involved in the formation of resins from phenols and acetylene. It is possible that this is the primary reaction involved in the initial stage of resinification. On the other hand, it is well known that phenols will combine under appropriate conditions with unsaturated compounds other than acetylene compounds. It may be that isanic acid contains ethylenic linkages, as well as acetylenic linkages, and this combination may take place at this point.

It has been suggested also that at temperatures herein employed, for instance, approximately 215° C., or slightly higher, that one may form enters of phenolic hydroxyls. See U. S. Patent No. 2,485,097, dated October 18, 1949, to Howland and Tewksbury, Jr. Over and above this fact, is the fact that at least some formaldehyde (a quarter of a mole or more) enters into the reaction, as previously noted. For this reason, no effort is made to speculate as to the composition, and subsequently in the claims, the resinous product is described in terms of method of manufacture, for the reason that this appears to be the only adequate method available.

It is to be noted that, enough formaldehyde is used to exhaust any functional groups present and susceptible to reaction with formaldehyde under the actual conditions of resinification.

Substantially the same procedure was followed with a number of other difunctional phenols, as shown in the table following. The examples are numbered 2 to 12. These phenols contain 4 to 14 carbon atoms in the substituent hydrocarbon radical. The procedure employed was substantially the same and the conditions substantially the same as in Example 1, preceding. The appearance of the final products was about the same, except that in a general way, the higher the weight of the substituent group, the greater the tendency towards giving a sticky, viscous liquid, rather than a solid material.

The solvent, such as xylene, can be removed from such resin by vacuum distillation at 150° C., or by any other convenient procedure. Such resins, of course, can be treated with oxyalkylating agents, such as ethylene oxide, propylene oxide, glycide, etc., but they may be also converted into valuable derivatives by reaction with other reagents, such as epichlorohydrin or ethylene imine. After reacting with epichlorohydrin, the intermediate product thus obtained can be reacted with a tertiary amine, such as pyridine, to give quaternary ammonium compounds, which are valuable for various purposes, such as stopping or inhibiting the growth of micro-organic organisms.

| Ex. No. | Phenol Used | Amt. | Boleko Nut Fatty Acid | Zince Acetate | Formaldehyde | HCl (Conc.) | Sulphonate |
|---|---|---|---|---|---|---|---|
| | | Grams | Grams | Grams | Grams | Grams | Grams |
| 2a | Para-secondary amylphenol | 172 | 150 | 15 | 45 | 3.5 | 1.5 |
| 3a | Mixed para-tertiary amylphenol and ortho-tertiary amylphenol | 172 | 150 | 15 | 44 | 3.5 | 1.5 |
| 4a | Ortho-tertiary amylphenol | 172 | 150 | 15 | 40 | 3.5 | 1.5 |
| 5a | Para-tertiary hexyl-phenol | 188 | 150 | 20 | 38 | 4.0 | 2.0 |
| 6a | Para-octyl-phenol | 216 | 150 | 25 | 46 | 4.0 | 2.0 |
| 7a | Para-phenyl-phenol | 178 | 150 | 20 | 44 | 4.0 | 2.0 |
| 8a | Para-cyclohexylphenol | 184 | 150 | 20 | 40 | 4.0 | 2.0 |
| 9a | Styrylphenol | 207 | 150 | 25 | 40 | 5.0 | 2.2 |
| 10a | Para-tertiary decylphenol | 245 | 150 | 25 | 40 | 5.0 | 2.2 |
| 11a | Para-tertiary dodecylphenol | 274 | 150 | 28 | 32 | 5.0 | 2.2 |
| 12a | Para-tertiary tetra-decylphenol | 315 | 150 | 30 | 50 | 5.5 | 2.3 |
| 13a | Para-tertiary butylphenol | 157 | 150 | 15 | 43 | 3.5 | 1.5 |

PART 2

We have prepared derivatives of the kind described in Part 1, preceding, on a scale varying from a few hundred grams or less in the laboratory, to several pounds on a pilot plant scale. The same applies in the preparation of the oxyalkylated compounds with which this second part of the text is concerned. In preparing a large number of examples we have found it particularly advantageous to use laboratory equipment which permits continuous oxypropylation and oxyethylation. More specific reference will be made to treatment with glycide, subsequently in the text. The oxypropylation step is, of course, the same as the oxyethylation step, insofar that two low boiling liquids are handled in each instance. What immediately follows refers to oxyethylation, and it is understood that oxypropylation can be handled conveniently in exactly the same manner.

The oxyethylation procedure employed in the preparation of derivatives of the preceding intermediates has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge, manual vent line; charge hole for initial reactants; at least one connection for conducting the incoming alkylene oxide, such as ethylene oxide, to the bottom of the autoclave; along with suitable devices for both cooling and heating the autoclave, such as a cooling jacket, and preferably, coils in addition thereto, with the jacket so arranged that it is suitable for heating with steam or cooling with water, and further equipped with electrical heating devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly ethylene oxide. The container consists essentially of a laboratory bomb having a capacity of about one-half gallon, or somewhat in excess thereof. This bomb was equipped, also, with an inlet for charging and an outlet tube going to the bottom of the container, so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing, so that continuous weighings could be made without breaking or making any connections. This also applied to the nitrogen line which was used to pressure the bomb reservoir. To the extent that it was required, any other usual conventional procedure or addition which provided greater safety was used, of course, such as safety glass, protective screens, etc.

With this particular arrangement practically all oxyethylations become uniform, in that the reaction temperature could be held within a few degrees of any selected point in this particular range. In the early stages where the concentration of catalyst is high, the temperature was generally set for around 150° C., or thereabouts. Subsequently, temperatures up to 170° C., or higher, may be required. It will be noted by examination of subsequent examples that this temperature range was satisfactory. In any case, where the reaction goes more slowly, a higher temperature may be used, for instance, 165° C., to 180° C., and if need be, 185° C. to 190° C. Incidentally, oxypropylation takes place more slowly than oxyethylation, as a rule, and for this reason, we have used a temperature of approximately 160° C. to 165° C., as being particularly desirable for initial oxypropylation, and have stayed within the range of 165° C. to 185° C., almost invariably during oxypropylation. The ethylene oxide was forced in by means of nitrogen pressure as rapidly as it was absorbed, as indicated by the pressure gauge in the autoclave. In case the reaction slowed up, the temperature was raised so as to speed up the reaction somewhat by use of extreme heat. If need be, cooling water was employed to control the temperature.

As previously pointed out in the case of oxypropylation, as differentiated from oxyethylation, there was a tendency for the reaction to slow up as the temperature dropped much below the selected point of reaction, for instance, 170° C. In this instance, the technique employed was the same as before, i. e., either cooling water was cut down, or steam was employed, or the addition of propylene oxide speeded up, or electric heat used in addition to the steam, in order that the reaction proceeded at, or near, the selected temperatures to be maintained.

Inversely, if the reaction proceeded too fast, regardless of the particular alkylene oxide, the amount of reactant being added, such as ethylene oxide, was cut down or electrical heat was cut off, or steam was reduced, or, if need be, cooling water was run through both the jacket and the cooling coil. All these operations, of course, are dependent upon the required number of conventional gauges, check valves, etc., and the entire equipment, as has been pointed out, is conventional, and, as far as we are aware, can be furnished by at least two firms who specialize in the manufacture of this kind of equipment.

Attention is directed to the fact that the use of glycide requires extreme caution. This is particularly true on any scale other than small laboratory or semi-pilot plant operations. Purely from the standpoint of safety in the handling of glycide, attention is directed to the following:

(a) If prepared from glycerol monochlorohydrin, this product should be comparatively pure;

(b) The glycide itself should be as pure as possible, as the effect of impurities is difficult to evaluate;

(c) The glycide should be introduced carefully and precaution should be taken that it reacts as promptly as introduced, i. e., that no excess of glycide is allowed to accumulate;

(d) All necessary precaution should be taken that glycide cannot polymerize per se;

(e) Due to the high boiling point of glycide, one can readily employ a typical separable glass resin pot, as described in the co-pending application of Melvin De Groote and Bernhard Keiser, Serial No. 8722, filed February 16, 1948, now Patent 2,499,365, granted March 7, 1950, and offered for sale by numerous laboratory supply houses. If such arrangement is used to prepare laboratory scale duplications, then care should be taken that the heating mantle can be removed rapidly, so as to allow for cooling; or better still, through an added opening at the top, the glass resin pot or comparable vessel should be equipped with a stainless steel cooling coil, so that the pot can be cooled more rapidly than mere removal of mantle. If a stainless steel coil is introduced, it means that conventional stirrer of the paddle type is changed into the centrifugal type, which causes the fluid or reactants to mix, due to swirling action in the center of the pot. Still better is the use of a laboratory autoclave of the kind previously described in this part; but in any event, when the initial amount of glycide is added to a suitable reactant, such as sorbitol, the speed of reaction should be controlled by the usual factors, such as (a) The addition of glycide;
(b) The elimination of external heat; and
(c) Use of a cooling coil, so there is no undue rise in temperature.

All the foregoing is merely conventional, but is included, due to the hazard in handling glycide.

As has been pointed out, the intermediates prepared as described in Part 1 are most conveniently handled as solutions in an inert solvent, such as xylene, decalin, mesitylene, diethylether of ethylene glycol, or the like. If such products are to be used after oxyethylation, for demulsification, or similar purposes, the solvent may remain. In some instances, it is convenient to add more solvent prior to oxyalkylation, and in other instances, part of the solvent may be removed. We have found it convenient to use a solution of about 70% intermediate and 30% solvent, usually xylene. The products obtained as described in Part 1 undergo oxyalkylation reactions very readily, particularly using the procedure, as previously described.

The oxyalkylation step is illustrated by the following examples:

Example 1b 210 grams of the intermediate identified as Example 1a and containing 30% solvent (xylene) were mixed with 4 parts of sodium methylate and placed in a small autoclave of the kind previously described. The autoclave was cooled, 100 grams of ethylene oxide were added, and the temperature was permitted to rise to approximately 150° to 165° C. At this stage the maximum pressure shown was 185 pounds per square inch. At the end of 3 hours, the pressure dropped to substantially zero and the ethylene oxide had reacted completely. The resultant product was a non-viscous, amber-colored liquid, which was water-emulsifiable.

After being cooled, a second 100-gram batch of ethylene oxide was added and the process repeated. During the second batch-wise oxyalkylation the time required was 4 hours, the maximum temperature was 160° C., and the maximum pressure was 165 pounds per square inch. A non-viscous, amber-colored liquid was obtained, which was almost water-dispersible.

After the autoclave had cooled, a third 100-gram batch of ethylene oxide was added. The third step of the reaction took place more rapidly than before, i.e., requiring only two hours. The maximum temperature was 170° C., and the maximum pressure was 160 pounds. The final product was a viscous, amber-colored liquid which was completely water-soluble.

The final product contained about 12½% xylene. The ratio of ethylene oxide to intermediate was about two to one.

Example 2b

The same procedure was followed as in Example 1b, preceding, in regard to the particular reactants, amounts, etc. In this instance, however, an autoclave was used which permitted continuous introduction of ethylene oxide.

The xylene solution of the intermediate (Example 1a) and a slightly increased amount of catalyst (5 grams) were introduced into the autoclave and sealed in the manner previously described. The temperature was then raised to approximately 185° C., and ethylene oxide was introduced in a steady stream, so as to maintain the reaction temperature within the range of 170° to 188° C. The maximum pressure during this period was 100 to 125 pounds per square inch. The ethylene oxide was introduced in slightly over three hours by this particular procedure, as compared with nine hours, using the intermittent procedure (batch-wise), as described in Example 1b, preceding. Additional examples are shown in the following table. These examples were obtained by using the continuous procedure with examples taken at two or more points during the oxyalkylation.

| Ex. No. | Derivative No. | Amt. Taken, Grams (Solvent-Free) | Solvent Present, Grams (Xylene) | Sod. Methylate Added, Grams | ETO Added Grams | Time (hours) | Temp. Max., °C. | Max. Pres., lbs. per sq. inch | Solubility in water |
|---|---|---|---|---|---|---|---|---|---|
| 3b | 6a | 366 | 105 | 8.0 | 105 | 1 | 170 | 105 | Insoluble. |
| 4b | 3b | 471 | 105 | | 98 | 1½ | 175 | 98 | Emuls. |
| 5b | 4b | 569 | 105 | | 206 | ¾ | 168 | 110 | Almost soluble. |
| 6b | 5b | 875 | 105 | | 210 | 1¾ | 169 | 140 | Soluble. |
| 7b | 8a | 234 | 87 | 7.3 | 99 | ¼ | 185 | 165 | Insoluble. |
| 8b | 7b | 333 | 87 | | 103 | ½ | 172 | 130 | Emuls. |
| 9b | 8b | 436 | 87 | | 156 | ½ | 165 | 145 | Almost soluble. |
| 10b | 9b | 592 | 87 | | 157 | ¼ | 165 | 200 | Soluble. |
| 11b | 10a | 395 | 118 | 8.5 | 97 | 1 | 185 | 130 | Insoluble. |
| 12b | 11b | 492 | 118 | | 102 | 1¼ | 180 | 90 | Do. |
| 13b | 12b | 594 | 118 | | 101 | 1½ | 185 | 125 | Emuls. |
| 14b | 13b | 695 | 118 | | 98 | 1 | 175 | 130 | Do. |
| 15b | 14b | 793 | 118 | 3.0 | 110 | 1 | 175 | 127 | Almost soluble. |
| 16b | 15b | 903 | 118 | | 112 | ¾ | 170 | 142 | Soluble. |
| 17b | 16b | 1,015 | 118 | | 152 | ¾ | 165 | 180 | Do. |
| 18b | 10b | 1,167 | 118 | | 156 | ½ | 175 | 175 | Very soluble. |
| 19b | 12a | 465 | 130 | 10.0 | 210 | 1 | 160 | 185 | Insoluble. |
| 20b | 19b | 675 | 130 | | 217 | 1¼ | 180 | 175 | Emuls. |
| 21b | 20b | 892 | 130 | | 204 | ½ | 185 | 134 | Almost soluble. |
| 22b | 21b | 1,095 | 130 | | 196 | ½ | 150 | 200 | Soluble. |
| 23b | 22b | 1,292 | 130 | 2.0 | 203 | ¾ | 160 | 195 | Very soluble. |
| 24b | 11a | 424 | 125 | 9.0 | 205 | ¾ | 180 | 135 | Insoluble. |
| 25b | 24b | 629 | 125 | | 205 | 1 | 170 | 145 | Soluble. |
| 26b | 25b | 834 | 125 | | 211 | 1½ | 155 | 165 | Do. |
| 27b | 26b | 1,045 | 125 | | 150 | 1 | 140 | 150 | Very soluble. |
| 28b | 27b | 1,195 | 125 | 3.0 | 153 | ¾ | 135 | 148 | Do. |
| 29b | 13a | 307 | 98 | 7.5 | 108 | ¾ | 155 | 120 | Insoluble. |
| 30b | 29b | 415 | 98 | | 102 | ½ | 160 | 90 | Do. |
| 31b | 30b | 507 | 98 | | 198 | ½ | 178 | 135 | Soluble. |
| 32b | 31b | 715 | 98 | | 243 | ¾ | 185 | 165 | Very soluble. |

Example 3b

Propylene oxide was used instead of ethylene oxide, following the same procedure as in Examples 1b through 2b, preceding, but with this particular change; the amount of propylene oxide added was reversed roughly in molar proportion, i. e., approximately 13¼ grams of propylene oxide were used to replace each 10 grams of ethylene oxide. Propylene oxide did not produce equivalent water-solubility, even at the ultimate stages, or even when used in a greater amount. For this reason, it is our preference to use propylene oxide, in combination with either ethylene oxide or glycide, or both.

In one modification the procedure followed was the same as in Examples 1b through 2b, but with this difference; in the first two stages of oxyalkylation the amount of ethylene oxide indicated was replaced by 32½% more of propylene oxide. In some instances, the time required for oxypropylation was somewhat longer than for oxyethylation, and in some instances, the temperature was slightly higher, 5° C. to 10° C., for example. The former insoluble product, after the second stage of oxypropylation, was then treated with ethylene oxide in the same manner noted in the previous table. If the product did not happen to be water-soluble or sufficiently water-soluble, a fourth oxypropylation was employed, using about 25% of the amount of ethylene oxide previously noted. This second addition of ethylene oxide and fourth oxyalkylation invariably produced water-solubility.

*Example 4b*

The same piece of equipment was used as previously described, i. e., an autoclave, although in the instant experiment involving the use of glycide there was no pressure involved and certain changes were made, as noted subsequently. The autoclave was equipped with a water-cooled condenser which was shut off when used as an autoclave. It was equipped also with a separatory funnel and an equalizing pressure tube, so that liquid, such as glycide, could be fed continuously at a drop-wise or a faster rate into the vessel and the rate was controlled by visual examination. For convenience, this piece of equipment is referred to as an autoclave, because it was designed essentially for such use, but it is to be noted that it was not so used when glycide was employed as the alkylene oxide.

There were charged into the autoclave the same reactants (intermediate, solvent, and sodium methylate) as in Example 1b. The autoclave was sealed, swept with nitrogen gas and stirring started immediately and heat applied. The temperature was allowed to rise to 120° C. The glycide employed was comparatively pure. 150 grams of glycide were used initially to replace the 100 grams of ethylene oxide employed in the first stage of Example 1b. This was charged into the upper reservoir vessel, which had been previously flushed out with nitrogen and was the equivalent of a separatory funnel. The glycide was started slowly into the reaction mass in a drop-wise stream. The reaction started to take place immediately and the temperature rose approximately 10° to 16°. Cooling water was run through the coils, so that the temperature for addition of glycide was controlled within the range roughly of 110° to 130° C. The addition was continuous within the limitations and all the glycide was added in less than two hours. This reaction took place at atmospheric pressure with simply a small stream of nitrogen passing into the autoclave at the very top and passing out through the open condenser, so as to avoid any possible entrance of air. Subsequently, two more additions of glycide were made, the first being 150 grams and the second being 100 grams. After the first addition of glycide there was obviously evidence of water-emulsifiability, and after the second addition, the product was somewhat soluble. The third addition of glycide was 75 grams. Although the total amount was somewhat less than the amount of ethylene oxide added in Example 1b, the final product had comparable solubility, and, as a matter of fact, both Examples 1b and 4b seemed to be equally effective as demulsifiers when tested on some emulsions from the Hobbs, New Mexico, oil field.

We have found the same alkaline catalyst satisfactory, but any of the other catalysts, such as sodium methylate, ground caustic soda, ground caustic potash, etc., are equally as good.

Also, we have prepared samples in which the weight of the alkylene oxide used was equal to 10 to 20 times by weight of the initial intermediate.

In addition to ethylene oxide, propylene oxide, glycide or mixtures of the two, or all three of these oxides, one can use also methyl glycide and butylene oxide. Butylene oxide, if employed at all, should be used in combination with ethylene oxide, glycide, or methylglycide. The most desirable combination is, of course, one in which the oxyalkylated derivative shows marked surface activity which can be readily detected by an emulsification test, as explained in the text immediately following.

Having obtained a suitable intermediate of the kind described, such intermediate is subjected to treatment with a low molal reactive alpha-beta olefine oxide so as to render the product distinctly hydrophile in nature, as indicated by the fact that it becomes self-emulsifiable or miscible or soluble in water, or self-dispersible, or has emulsifying properties. The olefine oxides employed are characterized by the fact that they contain not over 4 carbon atoms and are selected from the class consisting of ethylene oxide, propylene oxide, butylene oxide, glycide, and methylglycide. Glycide may be, of course, considered as a hydroxypropylene oxide and methylglycide as a hydroxybutylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide the oxygen-carbon ratio is 1:2. In glycide, it is 2:3; and in methyl glycide, 1:2. In such compounds the ratio is very favorable to the production of hydrophile or surface-active properties. However, the ratio in propylene oxide is 1:3, and in butylene oxide, 1:4. Obviously, such latter two reactants are satisfactorily employed only where the intermediate composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued, using the more favorable members of the class, to produce the desired hydrophile product. Used alone, these two reagents may, in some cases, fail to produce sufficiently hydrophile derivatives because of their relatively low oxygen-carbon ratios.

Thus, ethylene oxide is much more effective than propylene oxide, and propylene oxide is more effective than butylene oxide. Hydroxypropylene oxide (glycide) is more effective than propylene oxide. Similarly, hydroxybutylene oxide (methylglycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care, as previously noted.

As has been pointed out previously, the oxyalkylation of intermediates of the kind from which the products used in the practice of the present invention are prepared, is advantageously catalyzed by the presence of an alkali. Useful alkaline catalysts include soaps, sodium acetate, sodium hydroxide, sodium methylate, caustic potash, etc. As noted, the amount of alkaline catalyst usually is between 0.2% to 2%. The temperature employed may vary from room temperature to as high as 200° C. The reaction may be conducted with or without pressure, i. e., from zero pressure to approximately 200, or even 300, pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a non-volatile, strong acid such as sulfuric acid is used to catalyze the resinification or intermediate reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation of the intermediate in presence of an inert solvent such as xylene, cymene, decalin, ethylene glycol diethylether, diethyleneglycol, diethylether, or the like, although with many resins the oxyalkylation proceeds satisfactorily without a solvent. Since xylene is cheap and may be permitted to be present in the final product used as a demulsifier, it is our preference to use xylene.

Considerable of what is said immediately hereinafter is concerned with the ability to vary the hydrophile properties of the compounds used in the process, from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals, or moderately in excess thereof, are introduced per phenolic hydroxyl. Such minimum hydrophile property or sub-surface-activity or minimum surface-activity means that the product shows at least emulsifying properties or self-dispersion in cold or even in warm distilled water (15° C. to 40° C.) in concentration of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event, hydrophile properties are indicated by the fact that one can produce an emulsion by having present 10% to 50% of an inert solvent such as xylene. All that one need do is to have a xylene solution within the range of 50 to 90 parts, by weight, of oxyalkylated derivatives and 50 to 10 parts, by weight, of xylene and mix such solution with one, two, or three times its volume of distilled water and shake vigorously so as to obtain an emulsion which may be of the oil-in-water type, or the water-in-oil type (usually the former), but in any event, is due to the hydrophile-hydrophobe balance of the oxyalkylated derivative. We prefer simply to use the xylene diluted derivatives, which are described elsewhere, for this test, rather than evaporate the solvent and employ any more elaborate tests, if the solubility is not sufficient to permit the simple sol test in water, previously noted.

If the product is not readily water-soluble, it may be dissolved in ethyl or methyl alcohol, ethylene glycol diethylether, or diethylene glycol diethylether, with a little acetone added, if required, making a rather concentrated solution, for instance, 40% to 50%, and then adding enough of the concentrated alcoholic or equivalent solution to give the previously suggested 0.5% to 5.0% strength solution. If the product is self-dispursing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly okyalkylated resin intermediates give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin, intermediate chain, as is well understood.

Having thus described our invention, what we claim as new and desire to secure by Letters Patent is:

1. Hydrophile synthetic products; said hydrophile synthetic products being oxyalkylation products of: (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble phenol-isanic acid-formaldehyde resin; said resin being the condensation product of approximately 2 moles of a difunctional phenol, one mole of isanic acid, and one-fourth to one-half mole of formaldehyde; said resin being formed in the substantial absence of phenols of functionality greater than two; said phenol being of the formula:

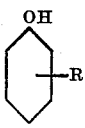

in which R is a hydrocarbon radical having at least 4 and not more than 14 carbon atoms and substituted in one of the positions ortho and para; said oxyalkylated resin being characterized by the introduction into the resin molecule of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. Hydrophile synthetic products; said hydrophile synthetic products being oxyethylation products of an oxyethylation-susceptible, fusible, organic solvent-soluble, water-insoluble, phenol-isanic acid-formaldehyde resin; said resin being the condensation product of two moles of a difunctional phenol, one mole of isanic acid, and one-fourth to one-half mole of formaldehyde; said resin being formed in the substantial absence of phenols of functionality greater than two; said phenol being of the formula:

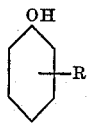

in which R is a hydrocarbon radical having at least 4 and not more than 14 carbon atoms and substituted in one of the positions ortho and para; said oxyethylated resin being characterized by the introduction into the resin molecule of a plurality of divalent radicals having the formula $(C_2H_4O)_{n'}$ wherein $n$ is a numeral varying from 1 to 20; with the proviso that at least 2 moles of ethylene oxide be introduced for each phenolic nucleus; and with the final proviso that the hydrophile properties of said oxyalkylated resin in an equal weight of xylene are sufficient to produce an emulsion when said xylene solution is shaken vigorously with one to three volumes of water.

3. The product of claim 2, wherein the phenol is para-tertiary amylphenol.

4. The product of claim 2, wherein the phenol is para-octylphenol.

MELVIN DE GROOTE.
BERNHARD KEISER.

No references cited.